INVENTORS
JACK HUEBLER
JAMES L. JOHNSON
FRANK C. SCHORA, JR.
PAUL B. TARMAN

United States Patent Office 3,442,620
Patented May 6, 1969

3,442,620
PRODUCTION OF HYDROGEN VIA THE
STEAM-IRON PROCESS
Jack Huebler, Deerfield, James L. Johnson, Oak Park, Frank C. Schora, Jr., Palatine, and Paul B. Tarman, Elmhurst, Ill., assignors to Consolidation Coal Company, Pittsburgh, Pa., a corporation of Delaware
Continuation-in-part of application Ser. No. 477,511, Aug. 5, 1965. This application Apr. 18, 1968, Ser. No. 722,389
Int. Cl. C01b 1/08
U.S. Cl. 23—214
10 Claims

ABSTRACT OF THE DISCLOSURE

A process for making hydrogen by the steam-iron reaction utilizing countercurrent gas-solids contact, wherein oxidation of Fe to $Fe_3O_4$ is conducted in two zones, one principally for the Fe to FeO reaction and the other principally for the FeO to $Fe_3O_4$ reaction; and the reduction of the $Fe_3O_4$ to Fe is also conducted in two zones for the same reactions in the reverse direction.

---

This application is a continuation-in-part of our copending application, Ser. No. 477,511, filed Aug. 5, 1965, now abandoned.

This invention relates to the production of hydrogen and steam-hydrogen mixtures for use in synthesis processes, such as the production of ammonia, methane, or other products of hydrogenation processes. In particular, this invention relates to the production of hydrogen by an improved steam-iron process wherein hydrogen is produced efficiently and in maximized yields.

The art has sought methods of producing hydrogen gas in large quantities for use in processes as noted above. For example, at present, hydrogen is obtained in most instances by reforming methane (natural gas) with steam. However, methane reformation is not so attractive for hydrogen production since the product gases contain not only hydrogen but also carbon monoxide, carbon dioxide, methane, and steam, which gases must be treated in conventional carbon monoxide shift and carbon dioxide removal equipment to achieve a final gas product rich in hydrogen.

There are also known processes for producing hydrogen which use the steam-iron reaction wherein steam is reacted with elemental iron or lower oxides of iron to produce hydrogen and iron oxides. The resultant iron oxides are then reduced with a reducing gas, usually containing carbon monoxide and hydrogen, to produce elemental iron and lower oxides. There have been proposed various fixed and fluidized bed cyclic processes, all of which suffer from poor hydrogen conversion due to improper design from thermodynamic and equilibrium considerations.

For example, Parsons, in U.S. Patent No. 1,658,939, describes a process wherein elemental iron is oxidized by steam to form FeO; and the formation of $Fe_3O_4$ is specifically avoided by low temperature operation. This process results in unduly low hydrogen production and is commercially unattractive.

Marshall, in U.S. Patent No. 2,182,747, describes a steam-iron process using, as oxidizing agent, liquid water under pressure at 450° to 700° F. High hydrogen yields are not commercially feasible with this process because of equilibrium limitations in the operation of a liquid-gas phase system.

Benson et al., in U.S. Patent No. 3,031,287, describe a steam-iron process for making synthesis gas containing hydrogen which utilizes, as an oxidizing agent, a gaseous mixture of carbon dioxide and steam at relatively low pressures. This process is for the production of gas mixtures containing primarily $H_2$, CO, and/or methane. Other patents which are illustrative of the state of the art include the following: U.S. Patents Nos. 2,772,954; 2,864,688; 2,996,373; and 3,076,702.

It is thus an object of this invention to produce hydrogen by the steam-iron process wherein there is effected a high utilization of the reducing gas in reduction of the iron oxide solids.

It is a further object of this invention to produce hydrogen by the steam-iron process wherein the oxidation and reduction phases of the process are effected at relatively high pressure to attain high reaction rates and rapid approaches to equilibrium.

It is yet another object of this invention to produce hydrogen by the steam-iron process wherein the oxidation and reduction phases of the process are effected separately and continuously at conditions which provide nearly equilibrium conversions of steam and reducing gas.

It is yet another object of this inveniton to produce hydrogen by the steam-iron process wherein the oxidation and reduction phases are effected continuously in separate reactors in which oxidation and reduction occur in each of the respective reactors in step-wise fashion in two distinct reaction zones.

Other objects will become apparent as the invention is more fully described hereinafter. In the drawings.

Figure 1:
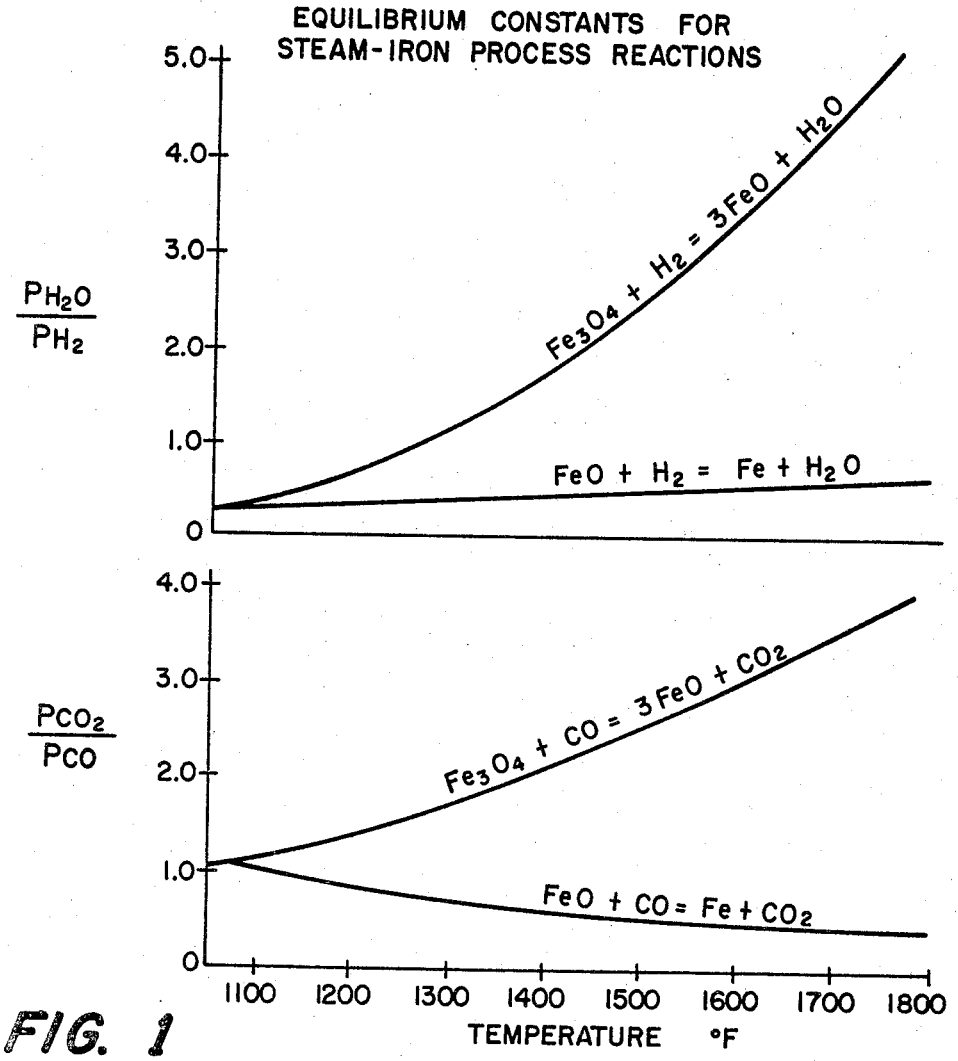
FIGURE 1 is a graph showing equilibrium constants as a function of temperature for the various chemical reactions involved in the invention.

In the process of this invention, hydrogen is produced by oxidation of reduced iron solids with steam. The resulting product gas, hydrogen and unreacted steam, is essentially free of other contaminants. The steam used in the oxidation process may also be admixed with noncondensable gases such as nitrogen or carbon dioxide. The oxidation is effected in a reaction zone wherein the oxidation step occurs in substantially two stages: in the first stage, elemental iron is oxidized to FeO, and in the second stage, FeO is oxidized to $Fe_3O_4$. In this disclosure, we denote the lower oxide of iron as FeO. As is well known in the art, the ratio of Fe to O in this oxide is slightly less than one, and this ratio will vary depending upon the gas composition with which it is in equilibrium. The first reaction stage occurs in a distinct subzone, preferably located above a subzone in which the second stage occurs, the solid materials being contacted countercurrently with gases as hereinafter more fully described. A continuous supply of reduced iron solids for the oxidation step is provided by subsequent reduction of the oxidized iron solids with a reducing gas. Reduction is also effected in a reaction zone wherein the reduction step occurs in substantially two stages: in the first stage, $Fe_3O_4$ is reduced to FeO, and in the second stage, FeO is reduced to elemental iron. The first reduction stage occurs in a distinct subzone, preferably located above a subzone in which the second stage occurs, the solid materials being contacted countercurrently with gases as hereinafter more fully described.

We have found that temperatures in the range of 1000° to 2000° F. generally allow sufficiently high reaction rates in both the oxidation and the reduction zones so that high steam and reducing gas conversions will result. More preferably ranges are 1000° to 15000° F. for oxidation and 1300° to 2000° F. for reduction. We have also found that reaction rates increase with pressure up to about 200 p.s.i.g. Therefore, operation about this minimal pressure, say 200 to 2500 p.s.i.g., can significantly decrease the required size of each reactor.

The essence of our invention is in providing that the oxidation and reduction reactions occur in reaction zones wherein both the oxidation and reduction steps are carried out in two stages in separate subzones of the oxidizer and reductor. The two-stage reactions are more fully described hereinafter.

The reducing gas used in the reduction reaction need only contain carbon monoxide and/or hydrogen in sufficient quantities to reduce oxidized iron solids. The presence of other constituents such as nitrogen, steam, carbon dioxide, methane, etc., does not affect the quality of hydrogen produced in the oxidation step. Thus, the reducing gas can be obtained from the least expensive and/or the most convenient source, such as the partial oxidation of coal, methane, shale oil or other hydrocarbons with air or a mixture of steam and air or with such gases as may be obtained by retorting oil shale. The air or air-steam mixture may also contain carbon dioxide. In addition, we have found that it is advantageous for the reducing gas to contain small quantities of sulfur which inhibit formation of iron carbides and free carbon. A suitable tail gas from other plant operations might be used as the reducing gas.

In carrying out the process of the invention, there are employed two reaction vessels: the oxidizer, where reduced iron solids are contacted with steam; and the reductor, where the oxidized iron solids are contacted with reducing gas. For continuous operation, it is necessary to recycle the iron solids from the oxidizer to the reductor. The equipment required for the transfer of solids can be of any type, mechanical or pneumatic, which are availble to all industrial processes.

In a solids recycle system, such as is utilized here, it is essential that cyclic solids conversion be exactly balanced with respect to all solids phases. If not balanced, the solids will tend to yield high reduction or high oxidation levels which limit solids reaction rates and gas conversions in the oxidizer or reductor.

The reactions pertinent to the cyclic reduction and oxidation of iron can be summarized:

(1) $Fe + H_2O \rightarrow FeO + H_2$  $K_1 = PH_2/PH_2O$
(2) $3FeO + H_2O \rightarrow Fe_3O_4 + H_2$  $K_2 = PH_2/PH_2O$
(3) $Fe_3O_4 + H_2 \rightarrow 3FeO + H_2O$  $K_3 = PH_2O/PH_2$
(4) $Fe_3O_4 + CO \rightarrow 3FeO + CO_2$  $K_4 = PCO_2/PCO$
(5) $FeO + H_2 \rightarrow Fe + H_2O$  $K_5 = PH_2O/PH_2$
(6) $FeO + CO \rightarrow Fe + CO_2$  $K_6 = PCO/PCO$ The first two reactions occur in the oxidizer and the last four in the reductor. Thus, for steady cyclic operations, the moles of elemental iron (Fe), oxidized with steam by reaction (1), must in turn be formed by reduction of wustite (FeO) with carbon monoxide and/or hydrogen by reactions (5) and (6). Also, the moles of magnetite ($Fe_3O_4$), formed in the oxidizer by reaction (2), must be reduced by carbon monoxide and/or hydrogen in the reductor by reactions (3) and (4).

The equilibrium constants for these reactions are shown in FIGURE 1 as a function of temperature in the range of 1050° F. to 1800° F. It can be seen that, as oxidation progresses and the $H_2O/H_2$ ratio decreases, the oxidation of wustite ceases before the oxidation of metallic iron. Likewise, as reduction progresses and the $H_2O/H_2$ and $CO_2/CO$ ratios increase, the reduction of wustite ceases before the reduction of magnetite.

We will first consider and discuss the problems of equilibrium and conversion connected with operation of the steam-iron process. As an example, if the reductor is maintained at 1490° F., the formation of iron by reactions (5) and (6) can occur only in the lower subzone of the reductor where the $H_2O/H_2$ and $CO_2/CO$ ratios are below 0.52. This corresponds to about 27 percent conversion of the carbon monoxide plus hydrogen in a typical reducing gas where the carbon monoxide plus hydrogen is about 90 percent of the total active gases (CO, $CO_2$, $H_2$, $H_2O$). The maximum equilibrium conversion of the $CO + H_2$ in this typical reducing gas is about 68 percent at 1490° F. ($H_2O/H_2$ and $CO_2/CO$ ratios of 2.52 for the reduction of magnetite). Therefore, the incremental reducing gas conversion from 27 to 68 percent can be effected by reaction (3) and (4) only. To obtain equilibrium reducing gas conversions at this temperature, the amount of magnetite reduced in the upper subzone by reactions (3) and (4) must, therefore, be about 1.5 times the amount of iron formed in the lower subzone by reactions (5) and (6). Since steady cyclic operation is necessary, the oxidation must in turn form 1.5 times as much magnetite by reaction (2) than iron oxidized by reaction (1). This magnetite can only be formed in the lower subzone of the oxidizer where $H_2/H_2O$ ratios are less than the equilibrium value for reaction (2). At 1490° F., this corresponds to only about 28 percent steam conversion.

Thus, to insure sufficient magnetite, the steam feed to the oxidizer must be about 1.5 times the carbon monoxide plus hydrogen fed to the reductor. As a result of this imbalance in active gas feeds, maximum steam conversion will be only 45 percent: 28 percent in the lower subzone by reaction (2), and 17 percent in the upper subzone by reaction (1). Thus, the lack of sufficient elemental iron in the solids feed to the oxidizer limits steam conversion to values far below the thermodynamic equilibrium value of 68 percent at 1490° F. Thus, it is seen that improper isothermal operation can seriously limit either the steam or reducing gas conversion; the reducing gas conversion would be decreased at lower steam/reducing gas ratios since the production of magnetite would be limiting.

Equilibrium conversion of both feed gases can only be obtained by isothermal operation at specific temperatures or by operation of the reductor and oxidizer at specific temperature differences. For instance, operation of the oxidizer at about 1350° F. and the reductor at 1490° F. would allow the steam conversion to reach 41 percent in the lower subzone before the equilibrium for reaction (2) was exceeded. Thus, steam fed to the oxidizer could equal the carbon monoxide plus hydrogen fed to the reductor and maximum thermodynamic steam conversion of 68 percent could be obtained: 41 percent in lower subzone by reaction (2), and 27 percent in upper subzone by reaction (1).

Figure 2:
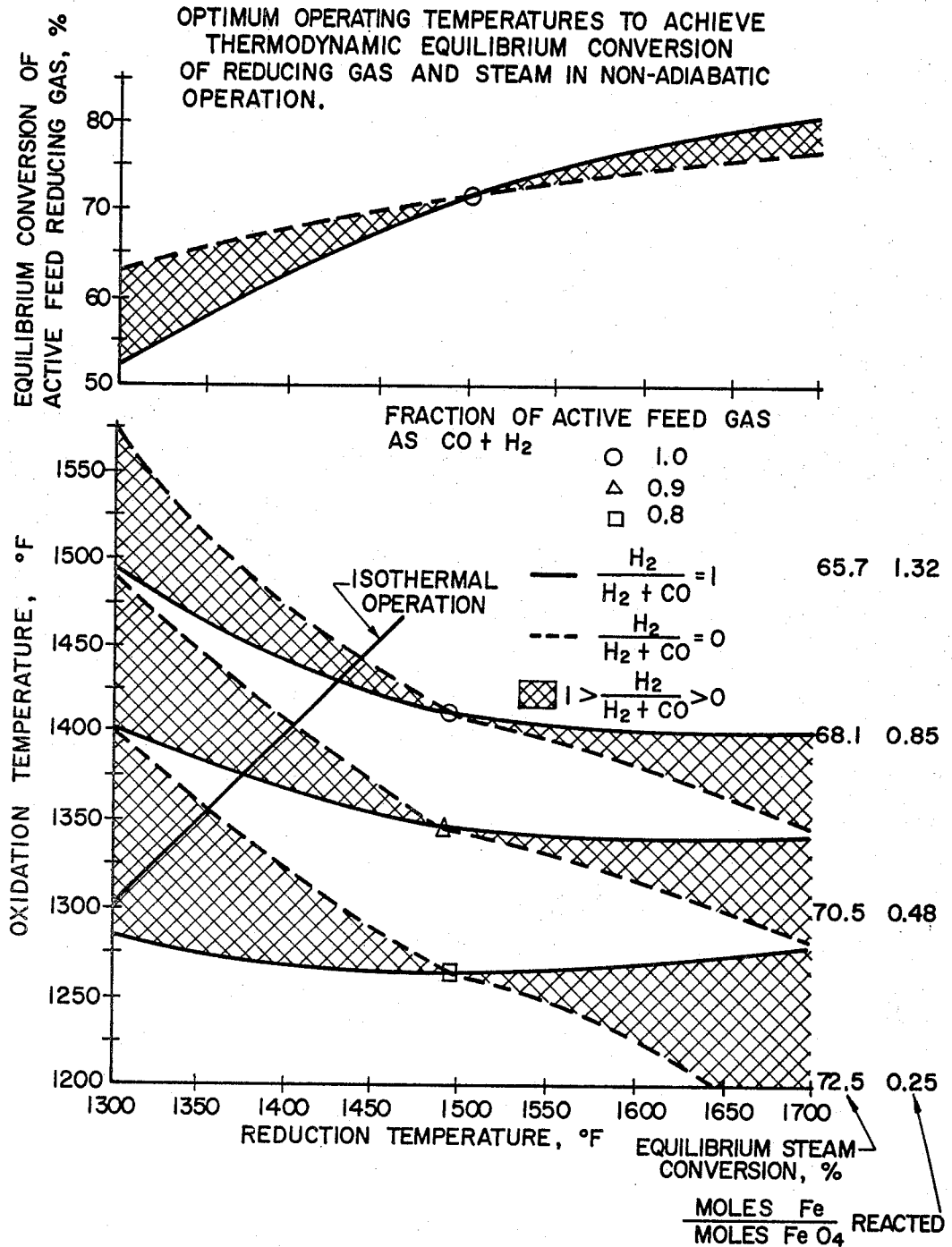
FIGURE 2 is a graph showing various relationships of process parameters, including the relationship of oxidation and reduction temperatures to composition of reducing gas feed.

The aboxe example is cited to stress the importance of maintaining proper temperature differences between the oxidizer and reductor to achieve equilibrium steam and reducing gas conversions. The corresponding operating temperatures to attain these conversions are given in FIGURE 2 over a range of 1300° F. to 1700° F. for different reducing gas qualities (reducing gas quality is herein defined as the fraction of carbon monoxide and hydrogen in the total active gases). FIGURE 2 shows that, for any given reduction temperature and reducing gas quality, the proper oxidation temperature depends only on the fraction of hydrogen in the carbon monoxide plus hydrogen feed. Thus, for any particular reducing gas and reductor temperature, the specific oxidation temperature can easily be determined from FIGURE 2.

Consider, as an example, a feed reducing gas containing 90 percent of its active gas as carbon monoxide plus hydrogen. We see that isothermal operation is only possible for such gas in the range of about 1375° F. to 1405° F., depending upon the ratio of hydrogen to the carbon monoxide plus hydrogen fed to the reductor. Low ratios of hydrogen to carbon monoxide plus hydrogen require operation proportionately closer to 1405° F. as shown in FIGURE 2 by the fact that the dotted lines represent 100 percent carbon monoxide—0 percent hydrogen. Operation of the reductor at temperatures higher than the isothermal temperature requires operation of the oxidizer at lower than the isothermal temperatures, and vice-versa. Operation of the reductor at 1600° F., for instance, with a reducing gas quality of 90 percent, requires oxidation temperatures in the range of about 1320° F. to 1345° F., depending upon the ratio of hydrogen to carbon monoxide plus hydrogen in the feed reducing gas.

FIGURE 2 also shows the equilibrium steam and reducing gas conversions obtained at the different sets of operating temperatures. The equilibrium steam conversion is shown along the vertical scale at the right side of FIGURE 2. Equilibrium reducing gas conversion is shown by the plot in the upper portion of FIGURE 2. Equilibrium reducing gas conversion, $Y_T$, in this plot is expressed as conversion of total active gases fed and, as such, is independent of gas quality. The conversion of carbon monoxide plus hydrogen fed, $Y$, is easily obtained for any particular reducing gas quality, $Q$, as follows:

$$Y = \frac{Y_T + Q - 100}{Q}$$

As shown, reducing gas conversions increase appreciably with reductor temperature, and steam conversion decreases slightly with oxidation temperatures. Thus, high reduction and low oxidation temperatures are more beneficial if large temperature differences can be practically maintained. FIGURE 2 also shows (along the right-hand vertical scale) the molar ratio of iron to magnetite reacted at the various oxidation temperatures.

We have found, according to our invention, that the gas conversions shown in FIGURE 2 are possible only when the gas and solids are contacted countercurrently in both the oxidizer and reductor. This ensures that the solids of the highest elemental iron content exiting the reductor are fed to the top of the oxidizer, and that the solids of the highest magnetite content exiting the oxidizer are fed to the top of the reductor.

In most large process equipment, heat additions or removals from reaction zones to control reactor temperatures is both difficult and expensive. For this reason, large reactors are usually operated essentially adiabatically; the heat inputs and outputs are those associated with the inlet and exit streams and reactor heat losses. In this process, oxidation is exothermic and reduction endothermic, except for reduction reaction (6) which is slightly exothermic. Therefore, temperature gradients will be imposed across each reaction zone. These gradients depend upon the gas and solids flow rates, heat capacities, and inlet and exit temperatures, and, also, upon the amount of solids reacted in each reaction zone. Thus, it is seen that oxidation and reduction temperatures cannot be chosen arbitrarily, but will be dictated as a result of the many variables involved. It is, therefore, highly unlikely that both equilibrium conversions can be simultaneously obtained because of these restrictions. However, it is possible to determine the optimum operating conditions (flow rates, temperatures, solids conversions, etc.) to yield maximum steam and reducing gas conversions for reducing gas compositions typical of those available for this process. It should be understood that the optimum operating conditions do depend on the composition of reducing gas, and will, therefore, vary accordingly.

EXAMPLE 1

As an example, the process of the invention was operated using a reducing gas of the following composition:

| Composition: | Mole percent |
|---|---|
| CO | 17.2 |
| $CO_2$ | 1.3 |
| $H_2$ | 35.0 |
| $H_2O$ | 4.6 |
| $CH_4$ | 0.8 |
| $N_2$ | 41.1 |

The solids material used was a commercial ammonia synthesis catalyst of 40–100 mesh size. The solids residence time was 20 seconds in the oxidizer, 30 seconds in the reductor. The gas composition above noted is typical of that produced by the adiabatic partial oxidation of methane at 1900° F. The optimum operating conditions to achieve maximum reducing gas and steam conversion are shown in Table I.

TABLE I.—GAS COMPOSITIONS AND FLOW RATES

| Gas | Reducing Gas | Spent Reducing Gas | Steam | Steam-$H_2$ |
|---|---|---|---|---|
| Temperature, °F | 1,380 | 1,550 | 1,100 | 1,405 |
| Moles/hr | 5.2 | 5.2 | 3.4 | 3.4 |
| Composition, Mole percent: | | | | |
| CO | 17.2 | 5.6 | | |
| $CO_2$ | 1.3 | 12.9 | | |
| $H_2$ | 35.0 | 11.3 | | 53.3 |
| $H_2O$ | 4.6 | 28.3 | 100.0 | 46.7 |
| $CH_4$ | 0.8 | 0.8 | | |
| $N_2$ | 41.1 | 41.1 | | |
| Total | 100.0 | 100.0 | 100.0 | 100.0 |

| | From Oxidizer | From Reductor |
|---|---|---|
| Solids (moles/hr.): | | |
| $Fe_3O_4$ | 3.26 | 1.92 |
| FeO* | | 3.55 |
| Fe | | 0.70 |
| Temperature, °F | 1,550 | 1,405 |

*Assumed as $Fe_{0.95}O$.

Note that solids compositions, gas compositions, inlet and exit temperatures (and internal reactor temperature gradients not shown in Table I), and the ratios of solids to gas flow rates are fixed for the particular reducing gas fed to the reductor. Changes in the independent operating variables, viz, feed gas temperatures and the ratio of solids to gas flow rates, will decrease either the reducing gas or steam conversion. For instance, higher steam or reducing gas inlet temperatures will result in higher solids temperatures in the reductor and oxidizer. These higher temperatures will effect slight increases in the reducing gas conversion, but a relatively larger decrease in steam conversion will result and the net hydrogen production per mole of reducing gas and steam fed will be decreased. It should be understood that the values listed for gas and solids flow rates are for illustrative purposes only. Larger throughput rates are, of course, possible. However, these rates should be increased proportionate to those listed in Table I for the particular feed reducing gas.

Figure 3:
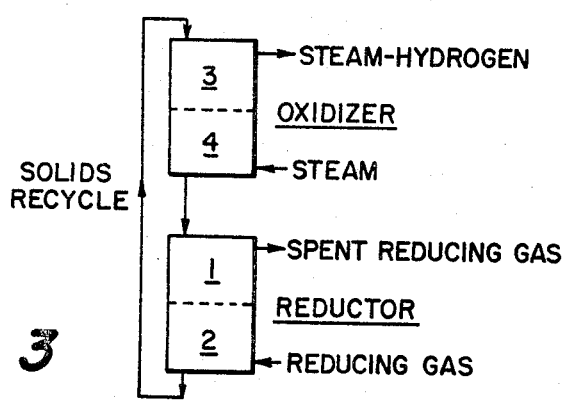
FIGURE 3 is a diagram showing the process steps of the invention.

According to the invention as shown diagrammatically in FIGURE 3, the reductor has upper and lower subzones 1 and 2. As hereinbefore described, the reduction occurs in the two subzones, the reduction of $Fe_3O_4$ to FeO occurring in subzone 1, and the reduction of FeO to elemental iron occurring in subzone 2. Similarly, the oxidizer has two subzones 3 and 4, the oxidation of elemental iron to FeO occurring in subzone 3, and the oxidation of FeO to $Fe_3O_4$ occurring in subzone 4. Solids are recycled as shown in FIGURE 3 from the bottom of subzone 2 to the top of subzone 3. Gases are introduced and exhausted from the oxidizer and reductor zones as indicated in FIGURE 3.

As mentioned previously, gas-solids contacting must be countercurrent to achieve optimum gas conversions. This contact may be effected in a moving, fluidized or solids free-fall bed. In particular, there may be used a free-fall bed where the solids fall through the upwardly moving gas and tend to reach their terminal downward velocity. Also, there may be employed a hindered free-fall bed wherein downwardly falling solids are baffled in their fall by means of a suitable baffle. One such baffled system consists of a 17-foot long by 2-inch I.D. oxidizer, and a 25-foot long by 2-inch I.D. reductor; both containing a spined baffle. These baffles consisted of vertical ⅜-inch diameter center support rods in which ¼-inch diameter spines were horizontally mounted. The spines were ½ inch apart (24 per foot of support rod) and located in such a manner that the entire cross-section of the reactor was covered by the 24 spines. Thus, each vertically falling particle of solids strikes at least one baffle each foot of reactor length. There may also be used a fluidized bed of high length/diameter ratio where the overall solids movement is countercurrent to gas flow. In the alternative, there may be used staged fluidized beds wherein there exists two distinct fluidized beds in each reactor.

The kind of bed used, fluidized or free-falling, depends to some extent on the nature of the solids. For example, we have found that some iron solids, such as ammonia synthesis catalysts, become "tacky" at temperatures above about 1000° F., and the solids free-fall bed is best suited to handle such solids since lower particle densities can be effectively utilized in the reactors. The rates of solids reaction, both oxidation and reduction, are also favored in solids free-fall beds, since the maximum differential velocity (terminal settling velocity of the particle) between gas and particles is obtained independent of linear gas velocity in the reactor. Thus, net reaction rates are not hindered by relatively low gas diffusion rates, as is often the case in fluidized and moving beds where gas velocities are normally maintained substantially below particle terminal velocities.

We have found that the process of our invention can effectively utilize several types of iron-bearing solids such as ammonia synthesis catalysts (an activated form of iron oxide), several types of iron ores such as siderites and magnetites (both raw and beneficiated), several types of ore sinters, and other similar iron compounds. The rates of reaction, both oxidation and reduction, measured in our work show that temperatures in excess of 900° F., preferably 1300° F. to 1700° F. are sufficient to effect conversions with solids residence times in each reaction zone on the order of 5 to 180 seconds, preferably 30 to 60 seconds in the reduction zone, and from 15 to 60 seconds in the oxidation zone using particles ranging in size from 10 to 320 mesh, preferably 40 to 100 mesh. The ratio of elemental iron to magnetite reacted in the oxidation zone is 0.12:1 to 1.85:1, preferably 0.3:1 to 0.5:1. The ratio of active gas to total iron in the system is between 0.18:1 and 9.0:1. The corresponding solids conversions (100 percent conversion equals 27.6 pounds oxygen transferred per 100 pounds solids fed) for these operating conditions are 2 to 30 percent, preferably 10 to 20 percent. Linear gas velocities (based on actual operating conditions and empty reactor dimensions) between 0.1 and 6 feet/second, preferably 2 to 3 feet/second, can be utilized with solids free-fall bed densities as high as 40 pounds/cubic foot, preferably 5 to 15 pounds/cubic foot. Operation with fluidized bed densities of 125 to 175 pounds/cubic foot, requires high length to diameter ratios, above about 5. Thus, solids backmixing is minimized, and true countercurrent operation is more closely approached. Staged bed fluidization techniques commonly employed in industry can also be used for this purpose, as previously mentioned.

We have found that reaction rates increase substantially with pressure increases in the range of 0 to about 200 p.s.i.g. Therefore, the process of our invention should operate in excess of about 200 p.s.i.g. to take full advantage of these higher reaction rates. The use of higher pressures, say 200 to 2500 p.s.i.g., preferably about 500 to 1500 p.s.i.g., may be advantageous, depending on the subsequent use of the hydrogen-steam mixture. For instance, pressures of 1000 to 1500 p.s.i.g. are favorable for hydrogasification of carbonaceous materials to produce methane. Further, if the product hydrogen is to be used in ammonia manufacture, it is advantageous to operate at pressures of up to 2500 p.s.i.g., at which pressure the hydrogen can be fed directly into the ammonia synthesis equipment. Higher pressure also increases solids residence time in a solids-free-fall reactor since the terminal settling velocity of particles decreases with increases in pressure.

We have also found that additions of methane to the feed reducing gas can increase its reducing quality by the following probable reactions.

(7) $CH_4 + H_2O = 3H_2 + CO$
(8) $CH_4 + Fe_3O_4 = 3FeO + CO + 2H_2$

The water for this reaction (7) is usually available in the raw feed gas and is also produced internally by the hydrogen reduction reactions. Since these reactions are endothermic, the heat of reaction must be supplied to the reductor to maintain proper reactor temperatures. This can be accomplished with higher inlet gas temperatures or by combustion of some of the spent reducing gas at the top of the reductor by the admission of air to this portion of the reductor.

We have also found that the addition of sulfur or sulfur compounds to the feed reducing gas is beneficial to the process. For example, hydrogen sulfide concentrations of 0.1 to 0.5 percent in the feed reducing gas inhibit the possible formation of free carbon; the formation of the unwanted products decreases the reducing quality of the reducing gases and causes the formation of carbon oxides in the oxidizer.

In commercially sized equipment, some heat losses from the system can be expected. Reasonable equipment design should limit these losses to less than 5 percent of the heat input to the system, in this case the enthalpy of the feed gas streams. Therefore, to maintain optimum temperature gradients in the reactors, higher inlet gas temperatures can be used as a convenient source of additional enthalpy. However, only enough additional enthalpy to balance heat losses should be provided, otherwise higher than optimum operating temperatures will result.

In our process, loss of solids temperature is detrimental to reducing gas conversion. Therefore, the most favorable reactor orientation with respect to temperature profiles is that which insures high inlet solids temperature to the reductor. For this reason, in one embodiment of our invention, the oxidizer should be mounted directly atop the reductor so that hot solids can be rapidly transferred from oxidizer bottom to reductor top as shown diagrammatically in FIGURE 3.

In such a reactor system, freshly reduced solids pass downwardly through the oxidizer through two reaction subzones indicated as 3 and 4, and exit at the bottom directly into the top of the reductor, subzone 1, with minimum heat loss. In subzone 3 there occurs predominantly reaction (1) hereinbefore described. In subzone 4 there occurs predominantly reaction (2). Freshly oxidized solids pass downwardly through the reductor through two reaction subzones indicated as 1 and 2, exiting into the bottom of a suitable lift means, e.g., a pneumatic lift where they are carried to the top of the oxidizer completing the cycle. In subzone 1, the predominant reactions are reactions (3) and (4); in subzone 2, reactions (5) and (6).

Any conventional reaction chambers and equipment can be used as oxidizer and reductor. For example, we have employed a 17-foot long oxidizer mounted directly atop a 25-foot long reductor, both with 2-inch internal diameters and both baffled, as discussed previously. A 6-inch I.D. hopper about 3 feet in length was mounted above the oxidizer, and a receiver of similar size was mounted below the reductor. The hopper contained a screw feeder for solids flow rate control so that excess solids were always stored directly above the screw. Solids were fed from the hopper at controlled rates and fell through the oxidizer, then through the reductor into the receiver from which the solids discharged into the bottom of the penumatic lift where they were entrained by the lift gas and carried to the top of the unit where the solids were disengaged from the lift gas and discharged into the hopper. Feed steam at controlled pressure and temperature enters at the bottom of the oxidizer, flows upwardly, contacts the solids countercurrently, and exits at the top of the oxidizer as product hydrogen and unreacted steam.

Feed reducing gas at controlled pressure and temperature enters the bottom of the reductor where it flows upwardly countercurrent to the solids, exiting at the top of the reductor. Both product gas streams are processed as required in conventional process equipment.

In this embodiment of the invention, feed reducing gas at controlled temperature and pressure is used in the pneumatic lift to transport solids from the bottom of the reductor to the top of the oxidizer. The gas entrains the solids, carries them upwardly through a conduit to a gas-solid separator, for example, a centrifugal separator where the solids are disengaged and fed into the oxidizer. Transport gas is then returned to the bottom of the reductor.

The following further examples illustrate the invention. In both Examples 2 and 3, the solids material and reactor residence times are the same as in Example 1.

EXAMPLE 2.—GAS COMPOSITIONS AND FLOW RATES

| Gas | Reducing Gas | Spent Reducing Gas | Steam | Steam-$H_2$ |
|---|---|---|---|---|
| Temperature, °F | 1,500 | 1,550 | 1,100 | 1,428 |
| Moles/hr | 2.21 | 2.21 | 1.69 | 1.69 |
| Composition, Mole percent: | | | | |
| CO | 14.7 | 4.6 | | |
| $CO_2$ | 1.6 | 11.7 | | |
| $H_2$ | 40.7 | 12.6 | | 50.1 |
| $H_2O$ | 6.7 | 34.8 | 100.0 | 49.9 |
| $CH_4$ | 1.2 | 1.2 | | |
| $N_2$ | 34.4 | 34.4 | | |
| Ar | 0.7 | 0.7 | | |
| Total | 100.0 | 100.0 | 100.0 | 100.0 |

| | From Oxidizer | From Reductor |
|---|---|---|
| Solids (moles/hr.): | | |
| $Fe_3O_4$ | 1.58 | 0.92 |
| FeO* | | 1.81 |
| Fe | | 0.27 |
| Temperature, °F | 1,550 | 1,428 |

*Assumed as $Fe_{0.95}O$.

EXAMPLE 3.—GAS COMPOSITIONS AND FLOW RATES

| Gas | Reducing Gas | Spent Reducing Gas | Steam | Steam-$H_2$ |
|---|---|---|---|---|
| Temperature, °F | 1,500 | 1,500 | 1,100 | 1,430 |
| Moles/hr | 3.65 | 3.65 | 2.02 | 2.02 |
| Composition, Mole percent: | | | | |
| CO | 21.4 | 7.8 | | |
| $CO_2$ | 4.5 | 18.1 | | |
| $H_2$ | 20.2 | 8.0 | | 46.7 |
| $H_2O$ | 6.0 | 18.2 | 100.0 | 53.3 |
| $N_2$ | 47.8 | 47.8 | | |
| $H_2S$ | 0.1 | 0.1 | | |
| Total | 100.0 | 100.0 | 100.0 | 100.0 |

| | From Oxidizer | From Reductor |
|---|---|---|
| Solids (moles/hr.): | | |
| $Fe_3O_4$ | 3.00 | 2.50 |
| FeO* | | 1.05 |
| Fe | | .50 |
| Temperature | 1,500 | 1,430 |

*Assumed as $Fe_{0.95}O$.

The above description has served to illustrate a specific application of this invention. Other modifications of equipment and operating conditions can easily be made by those skilled in the art to utilize more advantageously a specfic type of feed reducing gas or type of iron-bearing solids and is considered within the scope of this invention.

We claim:

1. A continuous steam-iron process utilizing countercurrent gas-solids contact for producing hydrogen comprising the following steps:

(1) reacting $Fe_3O_4$ with a reducing gas at a temperature from 1000° F. to 2000° F. in a reduction zone wherein said $Fe_3O_4$ is reduced to FeO in a first subzone and said FeO is reduced to elemental iron in a second subzone, and (2) reacting the resultant reduced solids product with steam at a temperature from 1000° F. to 2000° F. in an oxidation zone wherein said elemental iron is oxidized to FeO in a third subzone and said FeO is oxidized to $Fe_3O_4$ in a fourth subzone, step (1) being caused to occur countercurrently such that fresh reducing gas is contacted with substantially FeO to produce elemental iron and the resultant gas is contacted with substantially $Fe_3O_4$ to produce FeO, and step (2) being caused to occur countercurrently such that feed steam is contacted with substantially FeO to produce $Fe_3O_4$ and the resultant gas is contacted with substantially elemental iron to produce FeO, thereby producing hydrogen, and said steps (1) and (2) being operated at a pressure of minimally 200 p.s.i.g.

2. Process of claim 1 wherein the ratio of elemental iron to $Fe_3O_4$ reacted in the oxidation subzones is 0.12:1 to 1.85:1.

3. Process of claim 1 wherein the solids discharged from the fourth subzone, comprising substantially $Fe_3O_4$, are fed to the first subzone.

4. Process of claim 1 wherein the third and fourth subzones of step (2) are located above the first and second subzones of step (1) and wherein the solids discharged from the fourth subzone, comprising substantially $Fe_3O_4$, are fed directly to the first subzone whereby temperature loss between the first and fourth subzones is minimized.

5. Process of claim 1 wherein countercurrent flow between solids and gases in said reduction zone is attained by free-fall of solids downwardly through upwardly rising gas.

6. Process of claim 1 wherein countercurrent flow between solids and gases in said oxidation zone is attained by free-fall of solids downwardly through upwardly rising gas.

7. Process of claim 1 wherein countercurrent flow between solids and gases in said reduction zone is attained in a fluidized bed.

8. Process of claim 1 wherein countercurrent flow between solids and gases in said oxidation zone is attained in a fluidized bed.

9. Process of claim 1 wherein air is injected at the top of the first subzone to combust a portion of the spent reducing gas.

10. Process of claim 1 wherein the reducing gas contains carbon monoxide and hydrogen.

References Cited

UNITED STATES PATENTS

| 2,449,635 | 9/1948 | Barr | 23—214 |
| 3,031,287 | 4/1962 | Benson et al. | 23—214 XR |

FOREIGN PATENTS

| 21,479 | 1908 | Great Britain. |
| 578,323 | 6/1946 | Great Britain. |
| 639,554 | 6/1950 | Great Britain. |
| 645,140 | 10/1950 | Great Britain. |

EDWARD STERN, *Primary Examiner.*

U.S. Cl. X.R.

23—150, 200, 204